Oct. 20, 1925.
L. J. BAYER
1,557,792
SOOT BLOWER FOR BOILERS
Filed Nov. 13, 1922 — 2 Sheets-Sheet 1
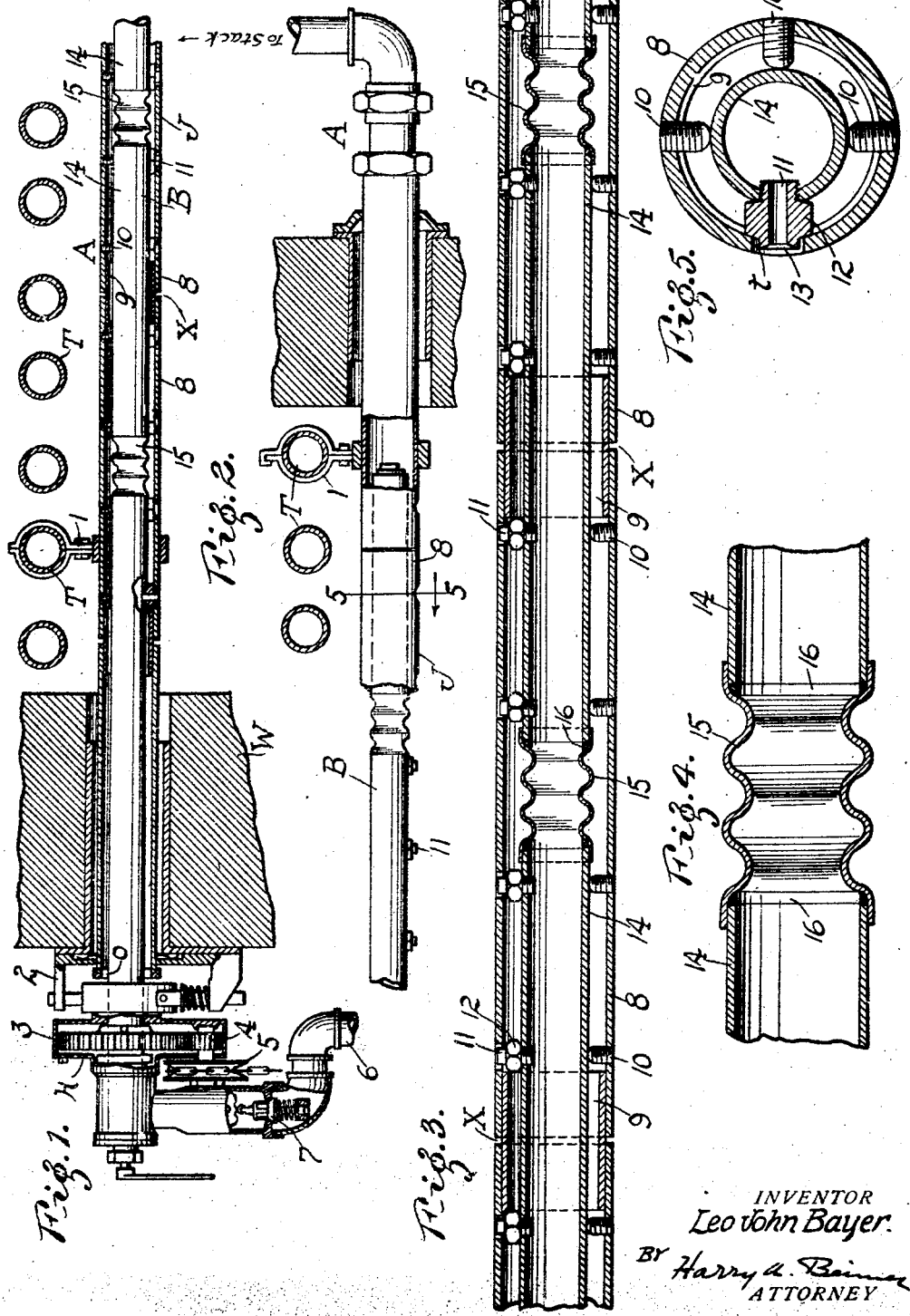
INVENTOR
Leo John Bayer.
BY Harry A. Beimer
ATTORNEY Oct. 20, 1925. 1,557,792
L. J. BAYER
SOOT BLOWER FOR BOILERS
Filed Nov. 13, 1922 2 Sheets-Sheet 2
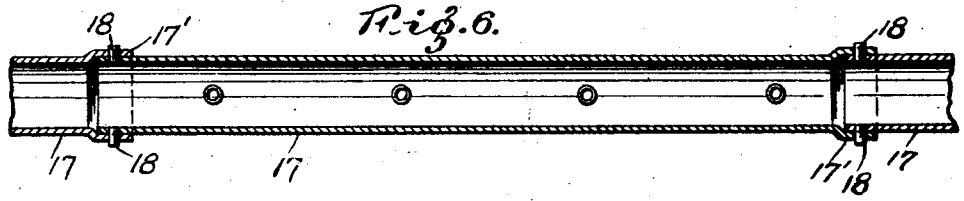
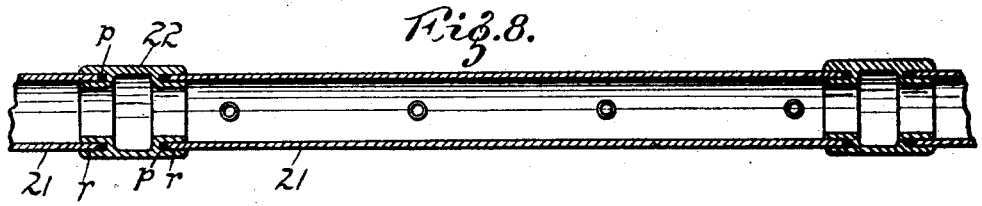
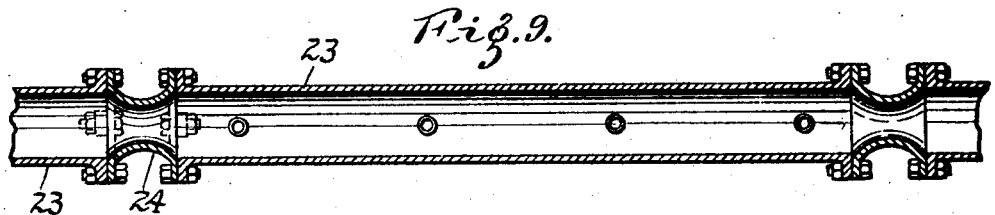
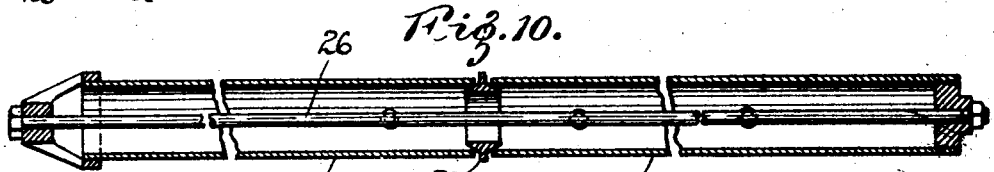
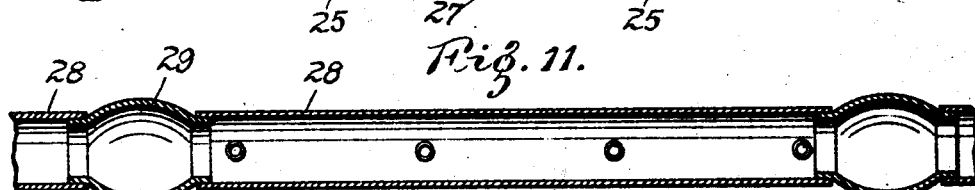
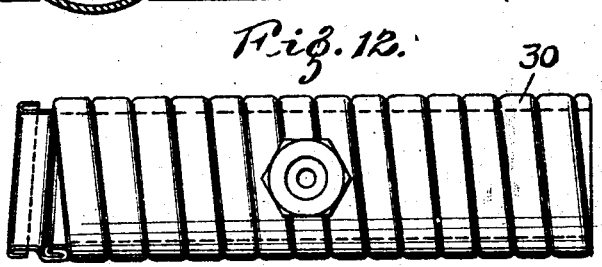
INVENTOR
Leo John Bayer
By Harry A. Baines
ATTORNEY Patented Oct. 20, 1925.

1,557,792

UNITED STATES PATENT OFFICE.

LEO JOHN BAYER, OF ST. LOUIS, MISSOURI.

SOOT BLOWER FOR BOILERS.

Application filed November 13, 1922. Serial No. 600,610.

*To all whom it may concern:*

Be it known that I, LEO JOHN BAYER, a citizen of the United States, residing at St. Louis, State of Missouri, have invented certain new and useful Improvements in Soot Blowers for Boilers, of which the following is a specification.

My invention has relation to improvements in soot blowers, or boiler cleaners, particularly applicable to water-tube boilers.

The principal object sought by the present improvements, is to provide a soot blower unit capable of withstanding the highest boiler temperatures for a long period of time without becoming unserviceable.

It is well known that in order to successfully remove the soot from the tubes and baffles of water-tube boilers, the various blower units that comprise a boiler cleaner must be distributed about the boiler from one end of the line of draft to the other. Now, toward the front of the line of draft the temperature of the gases is so high that a blower unit here located is soon rendered unfit for service. However, these forward blower units cannot be dispensed with, so the problem is, how to construct them to withstand this great heat. In my co-pending application, Serial No. 559,290, filed May 8, 1922, I show a blower unit comprising a blower pipe surrounded by a jacket through which air circulates about the blower pipe, the jacket being made in sections to overcome warping, as explained in said application. However, I have found that in some boilers the temperature runs so very high that the air circulation in the jacket is insufficient to hold down the temperature of the blower unit below that at which it becomes distorted. It is the object of the present invention to so construct the blower pipe that notwithstanding it may be subjected to considerable heat it will not become distorted, but will remain comparatively straight and serviceable for long periods.

Further advantages will be better apparent from a detailed description of the invention in connection with the accompanying drawings, in which—

Figure 1 is a combined side elevation and section of the front end of my improved blower unit, applied to a boiler, parts being broken away; Fig. 2 is a side elevation of the opposite end of said blower unit, the side wall of the boiler setting and tubes being in section; Fig. 3 is a middle longitudinal section through a part of the blower unit, showing the sectional jacket and sectional blower pipe comprising said unit; Fig. 4 is an enlarged section of a part of the blower pipe showing the ends of two tubular sections connected by a flexible element; Fig. 5 is a cross-section through the blower pipe and jacket taken on the line 5—5 of Fig. 2; Figures 6 to 11 inclusive are longitudinal sections of modified forms of blower pipe; Fig. 12 is a side elevation or a piece of flexible tubing that under certain conditions might satisfactorily be used for the blower pipe.

Referring to the drawings, and for the present to Figures 1 to 5 inclusive, A represents my improved blower unit supported by brackets 1 from the boiler tubes T, the head H of said unit being supported by a bracket 2 from the boiler wall W. The construction of the head H is the same as that shown in my co-pending application above referred to, and will not be specifically described herein. The unit A is rotated by a gear wheel 3, pinion 4, and pulley 5, and is provided with steam from a supply pipe 6 controlled by a valve 7 as in said application.

The blower unit A comprises a blower pipe B and jacket J surrounding and spaced from the blower pipe, so that air may enter the jacket through an inlet opening *o* and after circulating through the jacket around the blower pipe may discharge into the boiler flue (not shown). In order that the intense heat to which the jacket is subjected may not warp and distort the jacket out of line, said jacket is composed of a series of sections 8, each section being connected (by a sliding fit) to the adjacent section by an internal sleeve 9, a slight clearance X being provided between the sections 8 to permit of expansion under heat (Figures 2 and 3). By virtue of this construction expansion and contraction of the jacket is compensated for and buckling and warping of the unit does not take place, since any tendency in this regard in one section would be counteracted by another section, and the effect could not be cumulative, the sections acting independently.

The jacket J is maintained in spaced relation with the blower pipe B by radially disposed studs 10 screw-threaded through the sections 8 into sliding contact with the blower pipe B, the studs in any one place being 90° apart and distributed in alinement and equally spaced along the jacket. Opposite to one row of studs are the nozzles 11 adapted to discharge steam into the bank of tubes T, each nozzle being screw-threaded into the blower pipe B and having an intermediate polygonal enlargement 12, the inner surface of which bears against said pipe, and the outer suface of which is contoured to bear snugly against the inside of the jacket J. The discharge end 13 of each nozzle projects into an opening $t$ in the jacket, said opening being large enough to provide clearance around the nozzle end to permit of relative longitudinal movement of jacket and blower pipe, due to expansion and contraction, without shearing off the nozzles. The enlargement 12 closes the opening $t$ on the inside.

The blower pipe B is not subjected to the same degree of heat as the jacket because of the cooling effect of the air circulating through said jacket, and also the protection afforded by the jacket. However, in certain locations of some boilers the heat is so intense that even the jacket does not protect the blower pipe sufficiently against the heat, with the result that the blower pipe warps and forces the sections of the jacket out of line. I intend to overcome this difficulty by making the blower pipe in sections as well as the jacket. The blower pipe sections should be connected so that all joints are steam-tight to prevent loss of steam into the jacket. I have various methods of accomplishing this object, although the preferred form is shown in Figures 1 to 4 inclusive.

In this form the blower pipe B is composed of a series of pipe sections 14, 14, etc., the adjacent ends of the sections being received in the cylindrical ends of a comparatively short annularly corrugated member 15 composed of some flexible metal (such as copper). The ends of the pipe sections are welded to the member 15 entirely around their circumference as shown at 16, 16. Whatever tendency toward warping is imparted to the blower pipe by the heat to which it is subjected, will now be restricted to each individual section, and as the members 15 will yield with a movement of the sections 14 in any direction, this warping cannot be cumulative. Consequently there will be no distortion of the blower pipe considered as a unit since its longitudinal axis from end to end will remain undisturbed.

When my improved blower pipe is combined with the sectional jacket there results a blower unit that is practically unaffected by the hghest boiler temperatures and will remain serviceable for a long period without attention. Of course, in those parts of the boiler where the cooling jacket is not required, the sectional blower pipe is used alone just as integral blower pipes are now used with, however, greater advantages than the old one-piece blower pipe.

Referring now to the modifications, I show in Fig. 6, blower pipe sections 17, 17 having one end 17' flanged to receive the plain end of the adjacent section, the overlapping ends being connected by pins 18 This construction permits of a certain flexibility at the joints although not expansible as is the main form.

In Fig. 7 the sections 19 are connected by internal sleeves 20.

Fig. 8 shows a sort of stuffing-box connection, the sections 21 being connected by a member 22 with annular recesses $r$ for receiving the ends of adjacent sections, a suitable packing $p$ being stuffed in the base of the recesses.

Fig. 9 shows flanged sections 23 connected by bolts to flanged members 24 made of a suitable flexible material.

In Fig. 10 the respective sections 25 are held together by a rod 26, a suitable hollow member 27 being inserted between adjacent sections, said member having inclined walls for the end of the sections to engage.

Fig. 11 shows sections 28 welded to globular members 29 made of some flexible material.

Fig. 12 shows a piece of flexible tubing 30 adapted to the blower unit.

Obviously other forms may be devised, but any flexible blower pipe forming a part of a soot blower unit is contemplated by my invention.

Having thus described my invention, I claim:

1. In a soot blower for boilers, a steam supply pipe, a valve for controlling the steam supply in said pipe, and a blower unit in communication with the supply pipe, said blower unit comprising a blower pipe composed of a plurality of relatively movable sections and a cooling jacket surrounding the blower pipe, said cooling jacket also being composed of a plurality of relatively movable sections.

2. In a soot blower for boilers, a steam supply pipe, a blower unit comprising a flexible blower pipe and a jacket surrounding said blower pipe and spaced therefrom, and a valve for controlling the steam supply to said blower pipe.

3. In a soot blower for boilers, a steam supply pipe, a blower unit comprising a blower pipe and a jacket surrounding said blower pipe and spaced therefrom, a valve for controlling the steam supply to said blower pipe, said blower pipe comprising a series of sections and flexible members connecting said sections, said jacket comprising a series of sections and sleeves connecting the jacket sections, the aforesaid flexible members being disposed between successive sleeves throughout the blower unit.

In testimony whereof I hereunto affix my signature.

LEO JOHN BAYER.